United States Patent
Scott

(10) Patent No.: US 11,924,362 B2
(45) Date of Patent: Mar. 5, 2024

(54) ANONYMOUS UNCENSORABLE CRYPTOGRAPHIC CHAINS

(71) Applicant: INTUIT INC., Mountain View, CA (US)

(72) Inventor: Glenn Carter Scott, Los Altos Hills, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/877,544

(22) Filed: Jul. 29, 2022

(65) Prior Publication Data

US 2024/0039741 A1     Feb. 1, 2024

(51) Int. Cl.
  *H04L 9/00*    (2022.01)
  *H04L 9/08*    (2006.01)
  *H04L 9/32*    (2006.01)

(52) U.S. Cl.
  CPC .............. *H04L 9/50* (2022.05); *H04L 9/0819* (2013.01); *H04L 9/3213* (2013.01)

(58) Field of Classification Search
  CPC ........ H04L 9/50; H04L 9/0819; H04L 9/3213
  See application file for complete search history.

(56) References Cited

U.S. PATENT DOCUMENTS

| | | | |
|---|---|---|---|
| 9,992,022 B1 * | 6/2018 | Chapman | H04L 9/3236 |
| 10,666,434 B2 * | 5/2020 | Smith | G06Q 20/308 |
| 10,725,767 B2 * | 7/2020 | Jose | H04L 9/3239 |
| 10,946,291 B1 * | 3/2021 | Harris | A63F 13/85 |
| 11,271,751 B2 * | 3/2022 | de Matos | G06F 21/6218 |
| 11,567,904 B2 * | 1/2023 | Earley | H04L 9/0637 |
| 2009/0248641 A1 * | 10/2009 | Duan | G06F 16/215 |
| 2016/0261690 A1 * | 9/2016 | Ford | G06F 21/645 |
| 2017/0317997 A1 * | 11/2017 | Smith | G06Q 20/3829 |
| 2018/0034642 A1 * | 2/2018 | Kaehler | H04L 63/0442 |
| 2019/0014100 A1 * | 1/2019 | Scott | H04L 9/3242 |
| 2019/0123895 A1 * | 4/2019 | Blake | H04L 67/133 |
| 2019/0222418 A1 * | 7/2019 | O'Brien | G06Q 30/06 |
| 2020/0034551 A1 * | 1/2020 | Cantrell | H04L 9/3247 |
| 2020/0067907 A1 * | 2/2020 | Avetisov | H04L 9/50 |
| 2020/0117439 A1 * | 4/2020 | Jose | G06F 21/57 |
| 2020/0226678 A1 * | 7/2020 | Magnabosco | H04L 9/0637 |
| 2020/0349125 A1 * | 11/2020 | Earley | H04L 63/126 |
| 2020/0403786 A1 * | 12/2020 | de Matos | G06F 21/6218 |
| 2021/0044976 A1 * | 2/2021 | Avetisov | H04L 9/321 |

(Continued)

*Primary Examiner* — Saleh Najjar
*Assistant Examiner* — Nhan Huu Nguyen
(74) *Attorney, Agent, or Firm* — FERGUSON BRASWELL FRASER KUBASTA PC

(57) ABSTRACT

A method implements anonymous uncensorable cryptographic chains. The method includes receiving, from a first application, verifiable data for a current record and unverified data for the current record. The unverified data for the current record was received by the first application from a second application. The method further includes verifying the verifiable data for the current record with unverified data from a previous record. The method further includes recording the verifiable data for the current record and the unverified data for the current record to the current record responsive to verifying the verifiable data for the current record. The method further includes presenting the current record to one or more of the first application and to the second application.

16 Claims, 5 Drawing Sheets

(56) References Cited

U.S. PATENT DOCUMENTS

| | | | | |
|---|---|---|---|---|
| 2021/0336794 A1* | 10/2021 | Bres | ...................... | H04L 9/3247 |
| 2022/0109567 A1* | 4/2022 | Brickell | ................ | H04L 9/3247 |
| 2022/0263671 A1* | 8/2022 | Liu | ........................... | H04L 9/50 |
| 2022/0329416 A1* | 10/2022 | Larmuseau | ............. | H04L 9/085 |

* cited by examiner

|  | EVENT 402 | TOKEN 404 | SIGNATURE 406 | VERIFIABLE 408 | UNVERIFIED 410 |
|---|---|---|---|---|---|
| EVENT A 412 | EVENT ID A 422 | TOKEN ID A 424 | SIGNATURE A 426 | NULL 428 | H(K1) 430 |
| EVENT B 414 | EVENT ID B 432 | TOKEN ID A 434 | SIGNATURE A 436 | K1 438 | H(K2) 440 |
| EVENT C 416 | EVENT ID C 442 | TOKEN ID A 444 | SIGNATURE A 446 | K2 448 | H(K3) 450 |
| EVENT D 418 | EVENT ID D 452 | TOKEN ID A 454 | SIGNATURE A 456 | K3 458 | H(K4) 460 |

*FIGURE 4*

|  | EVENT 502 | TOKEN 504 | SIGNATURE 506 | VERIFIABLE 508 | UNVERIFIED 510 |
|---|---|---|---|---|---|
| EVENT A 512 | EVENT ID A 522 | TOKEN ID A 524 | SIGNATURE A 526 | NULL 528 | B1 530 |
| EVENT B 514 | EVENT ID B 532 | TOKEN ID A 534 | SIGNATURE A 536 | V1 538 | B2 540 |
| EVENT C 516 | EVENT ID C 542 | TOKEN ID A 544 | SIGNATURE A 546 | V2 548 | B3 550 |
| EVENT D 518 | EVENT ID D 552 | TOKEN ID A 554 | SIGNATURE A 556 | V3 558 | B4 560 |

*FIGURE 5*

|  | EVENT 602 | TOKEN 603 | SIGNATURE 604 | VERIFIABLE 605 | UNVERIFIED 606 |
|---|---|---|---|---|---|
| EVENT A 608 | EVENT ID A 621 | TOKEN ID A 622 | SIGNATURE A 623 | NULL 624 | H(K1) 625 |
| EVENT B 609 | EVENT ID B 626 | TOKEN ID A 627 | SIGNATURE A 628 | K1 629 | H(K2) 630 |
| EVENT C 610 | EVENT ID C 631 | TOKEN ID B 632 | SIGNATURE B 633 | NULL 634 | B1, B1^V1 635 |
| EVENT D 611 | EVENT ID D 636 | TOKEN ID C 637 | SIGNATURE C 638 | NULL 639 | B2, (H(K3))^V2 640 |
| EVENT E 612 | EVENT ID E 641 | TOKEN ID A 642 | SIGNATURE A 643 | K2 644 | H(K4) 645 |
| EVENT F 613 | EVENT ID F 646 | TOKEN ID B 647 | SIGNATURE B 648 | V1 649 | B3, B3^V3 650 |
| EVENT G 614 | EVENT ID G 651 | TOKEN ID C 652 | SIGNATURE C 653 | V2, K3 654 | B4, (H(K5))^V4 655 |
| EVENT H 615 | EVENT ID H 656 | TOKEN ID B 657 | SIGNATURE B 658 | V3 659 | B5, B5^V5 660 |
| EVENT I 616 | EVENT ID I 661 | TOKEN ID C 662 | SIGNATURE C 663 | V4, K5 664 | B6, (H(K6))^V6 665 |

*FIGURE 6*

ANONYMOUS UNCENSORABLE CRYPTOGRAPHIC CHAINS

BACKGROUND

Cryptographic chains use cryptography to exchange tokens between accounts and are managed, stored, and exchanged on digital computer systems. Cryptographic chains may be public and store records to distributed databases. Cryptographic chains may also be private and store records to centralized databases maintained by a private company. A challenge with cryptographic chains is that the accounts of users of the cryptographic chains may be centrally controlled and regulated, which allows for censorship of the users of cryptographic chains.

SUMMARY

In general, in one or more aspects, the disclosure relates to a method implementing anonymous uncensorable cryptographic chains. The method includes receiving, from a first application, verifiable data for a current record and unverified data for the current record. The unverified data for the current record was received by the first application from a second application. The method further includes verifying the verifiable data for the current record with unverified data from a previous record. The method further includes recording the verifiable data for the current record and the unverified data for the current record to the current record responsive to verifying the verifiable data for the current record. The method further includes presenting the current record to one or more of the first application and to the second application.

In general, in one or more aspects, the disclosure relates to a system implementing anonymous uncensorable cryptographic chains. The system includes a processor, a memory, and a chain application. The chain application is stored in the memory, executes on the processor, and is configured for receiving, from a first application, verifiable data for a current record and unverified data for the current record. The unverified data for the current record was received by the first application from a second application. The chain application is further configured for verifying the verifiable data for the current record with unverified data from a previous record. The chain application is further configured for recording the verifiable data for the current record and the unverified data for the current record to the current record responsive to verifying the verifiable data for the current record. The chain application is further configured for presenting the current record to one or more of the first application and to the second application.

In general, in one or more aspects, the disclosure relates to a method implementing anonymous uncensorable cryptographic chains. The method includes receiving, by the first application from a second application, unverified data for a current record. The method further includes transmitting, by the first application to a chain application, verifiable data for a current record and unverified data for the current record. The method further includes displaying the current record after the current record is recorded by a chain application. The chain application verifies the verifiable data for the current record with unverified data from a previous record. The chain application records the verifiable data for the current record and the unverified data for the current record to the current record responsive to verifying the verifiable data for the current record.

Other aspects of the invention will be apparent from the following description and the appended claims.

BRIEF DESCRIPTION OF DRAWINGS

FIG. 3, FIG. 4, FIG. 5, and FIG. 6 show examples in accordance with disclosed embodiments.

DETAILED DESCRIPTION

Figure 1A:
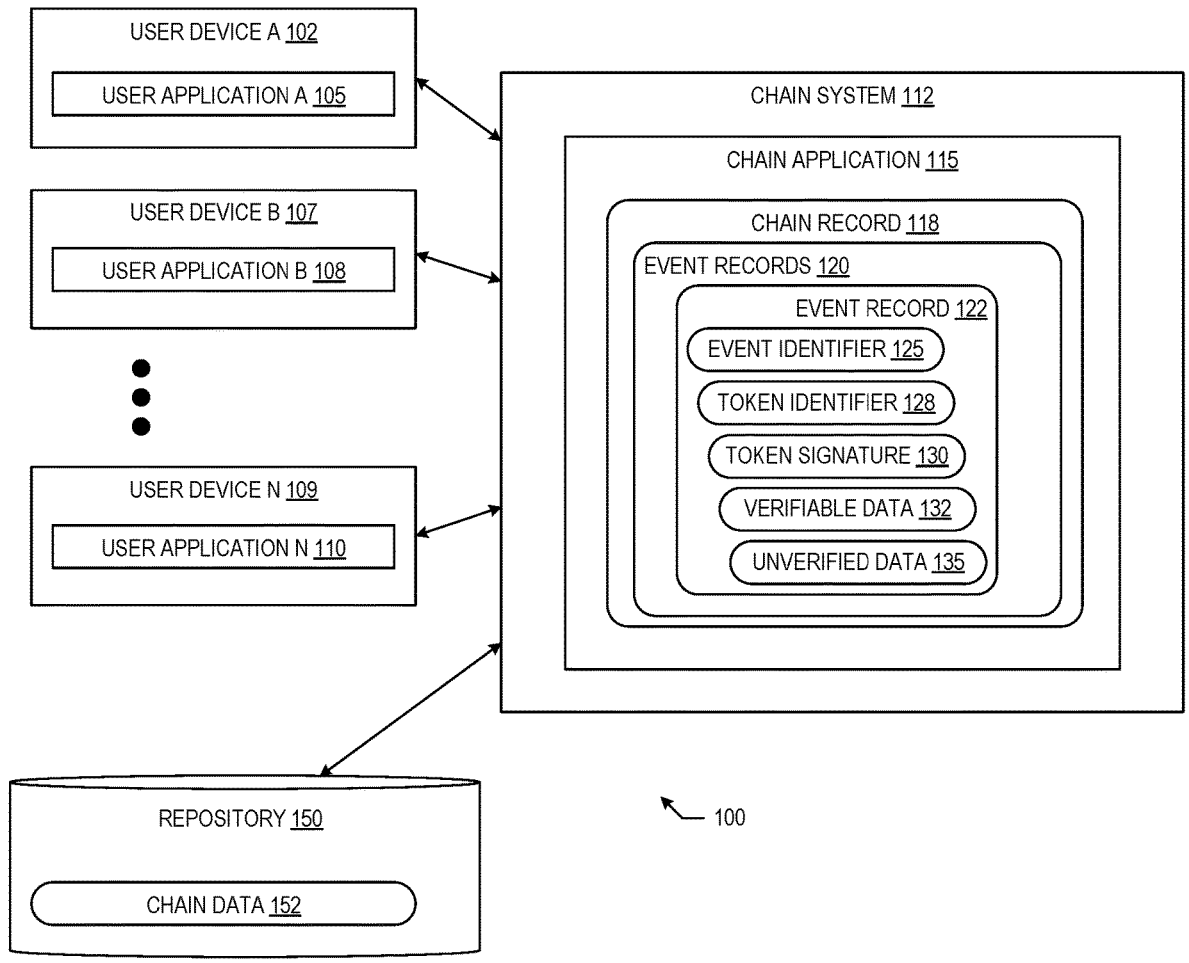
FIG. 1A, FIG. 1B, and FIG. 1C show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure implement cryptographic chains that provide anonymity, which may prevent censorship of the users of the cryptographic chains. Embodiments of the disclosure may exchange tokens using centralized ledger records or distributed ledger records. Embodiments of the disclosure provide a point of control over the initial supply of tokens but not over the accounts of users of the cryptographic chains. Transactions of tokens using the cryptographic chains are conducted anonymously with provisions to prevent double-spending and counterfeiting.

A challenge with cryptographic chains is that the event records of the chains transfer values between accounts by tracking the accounts and values of accounts. Embodiments of the disclosure use event records to track the transfer of tokens without tracking accounts of the users of the system.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of cryptographic chain systems and methods. The various elements, systems, components, and steps shown in the figures may be omitted, repeated, combined, and/or altered as shown from the figures. Accordingly, the scope of the present disclosure should not be considered limited to the specific arrangements shown in the figures.

Turning to FIG. 1A, the system (100) uses cryptographic chains to transfer tokens between users of the system (100) without tracking accounts of the users. Users interact with the system (100) by operating the user devices A (102) and B (107) through N (109), which communicate with the chain system (112). For example, users may interact with the system (100) to transfer tokens between each other using the chain system (112). The system (100) processes the transfers of tokens requested by the devices and programs of the system (100). The system (100) includes the user devices A (102) and B (107) through N (109), the chain system (112), and the repository (150).

Figure 7A:
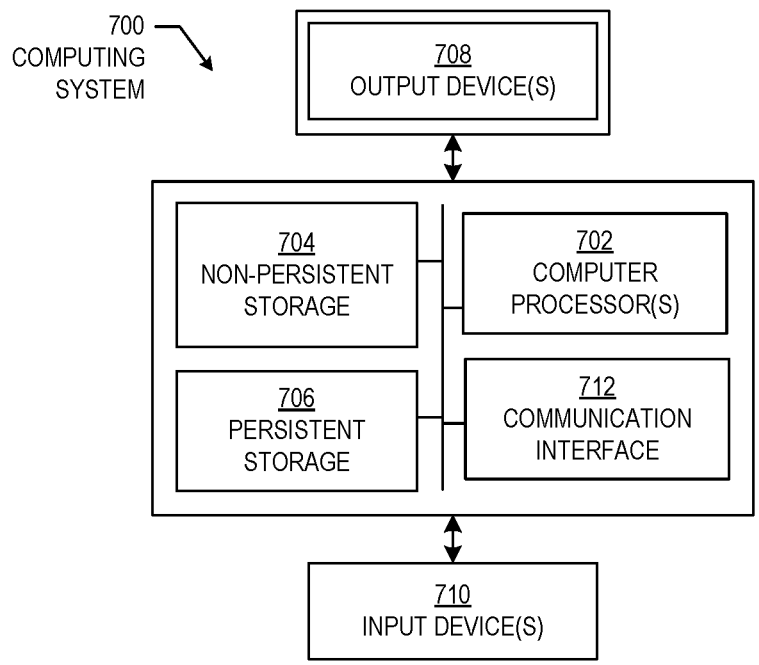
FIG. 7A and FIG. 7B show computing systems in accordance with disclosed embodiments.

The chain system (112) is a computing system (further described in FIG. 7A). The chain system (112) may include multiple physical and virtual computing systems that form part of a cloud computing environment. In one embodiment, execution of the programs and applications of the chain system (112) is distributed to multiple physical and virtual computing systems in the cloud computing environment. The chain system (112) includes the chain application (115).

The chain application (115) is a collection of programs that may execute on multiple computing systems, including the chain system (112) and the user devices A (102) and B (107) through N (109). The chain application (115) processes requests to update the cryptographic chain embodied with the chain record (118) and stored as the chain data (152) in the repository (150). The chain application (115) verifies the requests and appends the event records (120) (including the event record (122)) to the chain record (118). The chain application (115) verifies requests for transferring tokens using verifiable data (e.g., the verifiable data (132) of the event record (122)) of current event records (referred to as current records) and using unverified data (e.g., the unverified data (135) of the event record (122)) of previous event records (referred to as previous records).

The chain application (115) may also host websites accessed by users of the user devices A (102) and B (107) through N (109) to access the chain data (152) (which includes the chain record (118)). The websites hosted by the chain application (115) may serve structured documents (hypertext markup language (HTML) pages, extensible markup language (XML) pages, JavaScript object notation (JSON) files and messages, etc.). The chain application (115) includes the chain record (118).

The chain record (118) is a data structure that stores the event records (120). The chain record (118) may store the event records (120) as a sequence of events.

The event records (120) are a collection of records of events, including the event record (122). The event records (120) may be homogeneous with respect to a token or type of token and include records for one token or type of token. The event records (120) may be heterogeneous with respect to tokens and types of tokens and include records for multiple tokens or types of tokens.

The event record (122) is one of the event records (120). The event record (122) includes data that specifies the transfer of a token. The event record (122) includes the event identifier (125), the token identifier (128), the token signature (130), the verifiable data (132), and the unverified data (135).

The event identifier (125) identifies a particular event, which is a request to transfer a token. The event identifier (125) may be a numeric value that distinguishes one event from other events. In one embodiment, the event identifier (125) is a positive integer that increases by one for each event added to the chain record (118).

The token identifier (128) identifies the token to which the event record (122) correspondence. Each token used by the system (100) may have a unique identifier that distinguishes one token from other tokens. In one embodiment, the token identifier (128) may be an alphanumeric sequence that identifies the token.

The token signature (130) is a signature of a token by an initial distributor of the token. The initial distributor maintains a public distributor key and a private distributor key used for asymmetric encryption. The public distributor key may be distributed to the devices throughout the system (100). The private distributor key is retained by the initial distributor to prevent others from distributing tokens.

In one embodiment, the token signature (130) is generated by encrypting the token identifier (128) ("TI" in Equations 1 and 2 below) with the private distributor key ("IV" in Equation 1 below). Encryption is shown in Equation 1 as raising the token identifier (128) to the power of the private distributor key.

$$TS=TI^{IV} \quad \text{(Eq. 1)}$$

The token signature (130) ("TS" in the equations below) may be verified by decrypting the token signature (130) using the public distributor key ("IB" in Equation 2 below). Decryption is shown in Equation 2 as raising the token signature (130) to the inverse power (e.g., "1/IB") of the private distributor key.

$$TS^{1/IB}=TI \quad \text{(Eq. 2)}$$

Figure 1B:
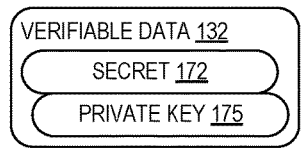

Continuing with FIG. 1A, the verifiable data (132) is data that is verified by the system (100) prior to adding the event record (122) to the chain record (118). The verifiable data (132) of the event record (122) can be verified with unverified data of a previous event record. FIG. 1B includes examples of verifiable data (132). For the initial transfer of a token, the verifiable data (132) may be "null" (no value or a value of "0")

Figure 1C:
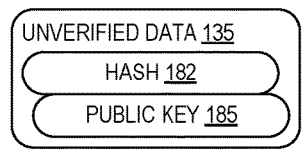

The unverified data (135) is data that has not been verified by the system (100) prior to adding the event record (122) to the chain record (118). The unverified data (135) of the event record (122) may be used to verify the verifiable data for a subsequent event record. FIG. 1C includes examples of the unverified data (135).

The user devices A (102) and B (107) through N (109) are computing systems (further described in FIG. 7A). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the chain system (112) to access, manipulate, and view the chain data (152) (including the chain record (118)) of the system (100). The user devices A (102) and B (107) through N (109) may communicate with the chain system (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment, the user applications A (105) and B (108) through N (110) include web browser programs that display web pages from the chain system (112) that may present the chain data (152).

As an example, the user application A (105) may be used by a user ("Alice") to transfer a token to the user ("Bob") of the user application B (107). The user application B (107) sends unverified data (e.g., the unverified data (135)) to the user application A (105), which sends the unverified data with verifiable data (e.g., the verifiable data (132)) to the chain application (115). The chain application (115) may send a verification to one or more of the user applications A (105) and B (107), which may display the verification of the transfer of the token.

As another example, the user application N (110) may be used by an initial distributor to create a token that is received by the user ("Alice") of the user application A (105). The user application A (105) sends unverified data to the user application N (110), which sends the unverified data (135) with null data to the chain application (115). The chain application (115) may send a verification to one or more of the user applications A (105) and N (110), which may display the verification of the creation and transfer of the token.

Continuing with FIG. 1A, the repository (150) is a computing system that may include multiple computing devices in accordance with the computing system (700) and the nodes (722) and (724) described below in FIG. 7A and FIG. 7B. The repository (150) may be hosted by a cloud services provider that also hosts the chain system (112). The cloud services provider may provide hosting, virtualization, and data storage services as well as other cloud services and to operate and control the data, programs, and applications that store and retrieve data from the repository (150). In one embodiment, the repository (150) and its contents may be distributed and included as part of the chain application (115) and user applications A (105) and B (108) through N (110). The data in the repository (150) includes the chain data (152).

The chain data (152) may include the records of multiple chain records (including the chain record (118)). In one embodiment, a separate chain record may be stored for each type of token. In one embodiment, a chain record may store event records for multiple types of tokens. Different types of tokens may use different types of verifiable data, unverified data, and algorithms to may verifications.

Turning to FIG. 1B, the verifiable data (132) is data that can be verified with data that has already been stored to the chain record (118) (of FIG. 1A). The verifiable data (132) may include one or more of the secret (172) and the private key (175).

The secret (172) is a value that is known to the current holder of a token. The secret (172) may be an alphanumeric sequence, a random number, etc. In one embodiment, the secret (172) may be hashed to match to a hash value of a previous event record to determine the verification of a current event record.

In one embodiment, additional information may be included in the secret (172). For example, the secret (172) may include a hash value from a previous event record along with the data for a current record to form the event record (122) as a block that is immutable and form the chain record (118) as a hash chain that is immutable. Storing the event records (120) as immutable blocks of a hash chain allows for validation of the hash chain so that previous records cannot be changed without invalidating the hash chain. Validation is performed by recomputing the hashes of the blocks stored in the hash chain. If data from a previous block has been changed, then the hash values for the subsequent blocks on the hash chain will not match with the values stored in the hash chain and show that the hash chain is invalid.

The private key (175) is an asymmetric encryption key it is known to the current holder of a token. In one embodiment, the private key (175) may be used to encrypt data that may be decrypted with a public key of a previous event record to determine the verification of a current record.

Turning to FIG. 1C, the unverified data (135) is data that has not been verified before being stored to the chain record (118) (of FIG. 1A). The unverified data (135) may include one or more of the hash (182) and the public key (185).

The hash (182) is a value that may be generated with a cryptographic hash function. In one embodiment, the hash (182) for the event record (122) is generated from a secret of the event record that precedes the event record (122). The hash (182) is publicly available to the users of the system (100) before the corresponding secret that was used to generate the hash (182) is available to the system (100). The hash (182) may be generated with a cryptograph hashing algorithm, examples of which include the MD5 algorithm, the SHA algorithms, the BLAKE algorithms, etc.

The public key (185) is an asymmetric encryption key it is publicly known to the users of the system (100). In one embodiment, the public key (185) may be used to decrypt data that was encrypted with a private key of a subsequent event record.

Although shown using distributed computing architectures and systems, other architectures and systems may be used. In one embodiment, the chain application (115) may be part of a monolithic application that implements cryptographic chains. In one embodiment, the user applications A (105) and B (108) through N (110) may be monolithic applications that implement cryptographic chains without the chain application (115).

Figure 2:
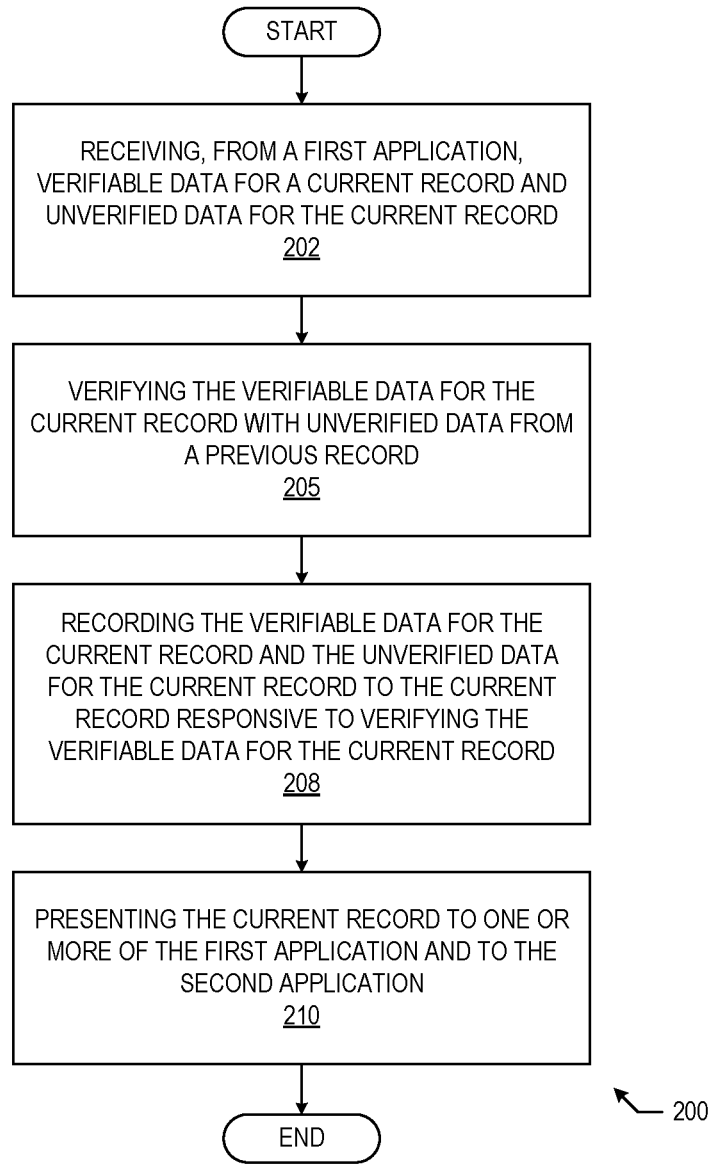
FIG. 2 shows a flowchart in accordance with disclosed embodiments.

Turning to FIG. 2, the process (200) transfers tokens using cryptographic chains. The process (200) may be performed by a computing system.

At Step 202, verifiable data for a current record and unverified data for the current record are received from a first application. The unverified data for the current record was received by the first application from a second application. The verifiable data for the current record may include a secret used in a previous record, a private key for a previous record, etc. The verifiable data for the current record may have been generated by the first application and may be verified using unverified data of a previous record already stored to the cryptographic chain. The unverified data for the current record may include a hash of a secret for the current record, a public key for the current record, data encrypted with a private key for the current record, etc. The private key for the current record corresponds to the public key for the current record and may be used to decrypt data encrypted with the public key for the current record.

At Step 205, the verifiable data for the current record is verified with unverified data from a previous record. The verification may be performed using cryptographic functions, including cryptographic hash functions.

In one embodiment, the verifiable data for a current record (e.g., event n) includes a secret (e.g., $K_{n-1}$) and the unverified data for the current record includes a hash (e.g., $H(K_n)$), which is depicted in the Table 1 below. The secret of a current record (e.g., key $K_{n-1}$ of event n) may be verified by processing the secret of the current record to compute a hash and comparing the computed hash to the hash stored in a previous record (e.g., the hash $H(K_{n-1})$ of event n-1). When the computed hash is the same as the hash stored in the previous record, then the hashes match and the verification is successful.

TABLE 1

| Event | Verifiable Data | Unverified Data |
|---|---|---|
| 0 | Null | $H(K_0)$ |
| 1 | $K_0$ | $H(K_1)$ |
| n – 1 | $K_{n-2}$ | $H(K_{n-1})$ |
| N | $K_{n-1}$ | $H(K_n)$ |

The secret (e.g., $K_n$) may be a random number and may include additional information. In one embodiment, the secret (e.g., $K_n$) may include a proof of work. The proof of work may be a random number that satisfies a constraint (e.g., causes the hash of the secret to include at least a threshold number of leading zeros). In one embodiment, the additional information may be information that is appended into the secret and the additional information may include a hash from a previous record (to form an immutable block of a hash chain) and may include the information from the current record (e.g., the verifiable data).

In one embodiment, the verifiable data for a current record (e.g., for event n) includes a private key (e.g., the private key $V_{n-1}$) and the unverified data for the current record includes a public key (e.g., the public key $B_n$), which is depicted in the Table 1 below. The private key of a current record (e.g., the private key $V_{n-1}$ of event n) may be verified with the public key stored for the previous event (e.g., the public key $B_{n-1}$ of event n-1). The verification may include encrypting a value (e.g., a random value, the private key $V_{n-1}$, the public key $B_{n-1}$, combinations thereof, etc.) with one of the private key and the public key, decrypting with the other key, and comparing the decrypted value with the original value. For example, the value X may be encrypted with the private key $V_{n-1}$ to generate the encrypted value $X^{V_{n-1}}$. The encrypted value $X^{V_{n-1}}$ may be decrypted with the public key $B_{n-1}$ to generate the decrypted value $$\left(X^{V_{n-1}}\right)^{\left(\frac{1}{B_{n-1}}\right)}.$$

The decrypted value $$\left(X^{V_{n-1}}\right)^{\left(\frac{1}{B_{n-1}}\right)}$$

may then be compared to the original value X. When the decrypted value is the same as the original value $$\left(\text{i.e., } \left(X^{V_{n-1}}\right)^{\left(\frac{1}{B_{n-1}}\right)} = X\right),$$

then the verification is successful.

TABLE 2

| Event | Verifiable Data | Unverified Data |
|---|---|---|
| 0 | Null | $B_0$ |
| 1 | $V_0$ | $B_1$ |
| n – 1 | $V_{n-2}$ | $B_{n-1}$ |
| n | $V_{n-1}$ | $B_n$ |

In one embodiment, the verifiable data for a current record (e.g., for event n) includes a private key (e.g., the private key $V_{n-1}$) and the unverified data for the current record includes a public key (e.g., the public key $B_n$) and includes an encrypted value, which may be the public key encrypted with the private key (e.g., the encrypted value $B_n^{V_n}$), which is depicted in the Table 3 below. Possession, by the provider of the unverified data, of the private key $V_n$ may be confirmed by decrypting the encrypted value and confirming that the decrypted value is the same as the original value, i.e., the public key. The private key of a current record (e.g., the private key $V_{n-1}$ of event n) may be verified using the public key and the encrypted value of the previous record (e.g., the public key $B_{n-1}$ and the encrypted value $B_{n-1}^{V_{n-1}}$ of the previous record). In one embodiment, the verification may include encrypting the public key $B_{n-1}$ with the private key $V_{n-1}$ to generate a computed value and comparing the computed value to the encrypted value $B_{n-1}^{V_{n-1}}$ stored in the previous record. When the computed value is the same as the encrypted value, then the verification is successful.

TABLE 3

| Event | Verifiable Data | Unverified Data |
|---|---|---|
| 0 | Null | $B_0, B_0^{V_0}$ |
| 1 | $V_0$ | $B_1, B_1^{V_1}$ |
| n – 1 | $V_{n-2}$ | $B_{n-1}, B_{n-1}^{V_{n-1}}$ |
| n | $V_{n-1}$ | $B_n, B_n^{V_n}$ |

In one embodiment, the verifiable data for a current record (e.g., for event n) includes a private key (e.g., the private key $V_{n-1}$) and a secret (e.g., the secret $K_{n-1}$) and the unverified data for the current record includes a public key (e.g., the public key $B_n$) and includes an encrypted value, which may be a hash of a secret encrypted with the private key (e.g., the encrypted value $(H(K_n))^{V_n}$), which is depicted in the Table 4 below. The private key and the secret of a current record (e.g., the private key $V_{n-1}$ and the secret $K_{n-1}$ of event n) may be verified using the public key and the encrypted value of the previous record (e.g., the public key $B_{n-1}$ and the encrypted value $(H(K_{n-1}))^{V_{n-1}}$ of the previous record). In one embodiment, the verification may include decrypting the encrypted value $(H(K_{n-1}))^{V_{n-1}}$ with the public key $B_{n-1}$ to generate a decrypted value $$\left((H(K_{n-1}))^{V_{n-1}}\right)^{\left(\frac{1}{B_{n-1}}\right)};$$

hashing the secret $K_{n-1}$ to generate a hashed value $H(K_{n-1})$; and comparing the decrypted value $$\left((H(K_{n-1}))^{V_{n-1}}\right)^{\left(\frac{1}{B_{n-1}}\right)}$$

to the hashed value $H(K_{n-1})$. When the decrypted value is the same as the hashed value, then the verification is successful.

TABLE 4

| Event | Verifiable Data | Unverified Data |
|---|---|---|
| 0 | Null | $B_0, (H(K_0))^{V_0}$ |
| 1 | $V_0, K_0$ | $B_1, (H(K_1))^{V_1}$ |
| n – 1 | $V_{n-2}, K_{n-2}$ | $B_{n-1}, (H(K_{n-1}))^{V_{n-1}}$ |
| N | $V_{n-1}, K_{n-1}$ | $B_n, (H(K_n))^{V_n}$ |

At Step 208, the verifiable data for the current record and the unverified data for the current record are recorded to the current record responsive to verifying the verifiable data for the current record.

In one embodiment, the current record includes an event identifier of a transfer of a token. The event identifier may be a positive integer. The token is transferred by publishing the verifiable data for the current record to remove the secrecy of the unverified data from the previous record and adding new unverified data. The token is effectively transferred from the possessor of the previous secret (or private key) to the possessor of the current secret (or private key) without identifying the accounts of the users.

In one embodiment, the current record is part of a sequence of records corresponding to a token identifier and a token signature. The individual event records may store the verifiable data and the unverified data without storing copies of one or more of the token identifiers and the token signature. The token identifier and the token signature may be stored in a chain record that includes the event record.

In one embodiment, the current record includes a token identifier and a token signature. Each event record in a chain record may include the token identifier and the token signature.

In one embodiment, the current record is part of a sequence of records of a plurality of token identifiers and a plurality of token signatures. A chain record may include event records for multiple different tokens that have different token identifiers and different token signatures.

At Step 210, the current record may be presented to one or more of the first application and to the second application. The current record may be presented by transmitting the current record to a user device, which displays the event record with a user application in a user interface. In one embodiment, the current record may be displayed in a table of event records.

Figure 3:
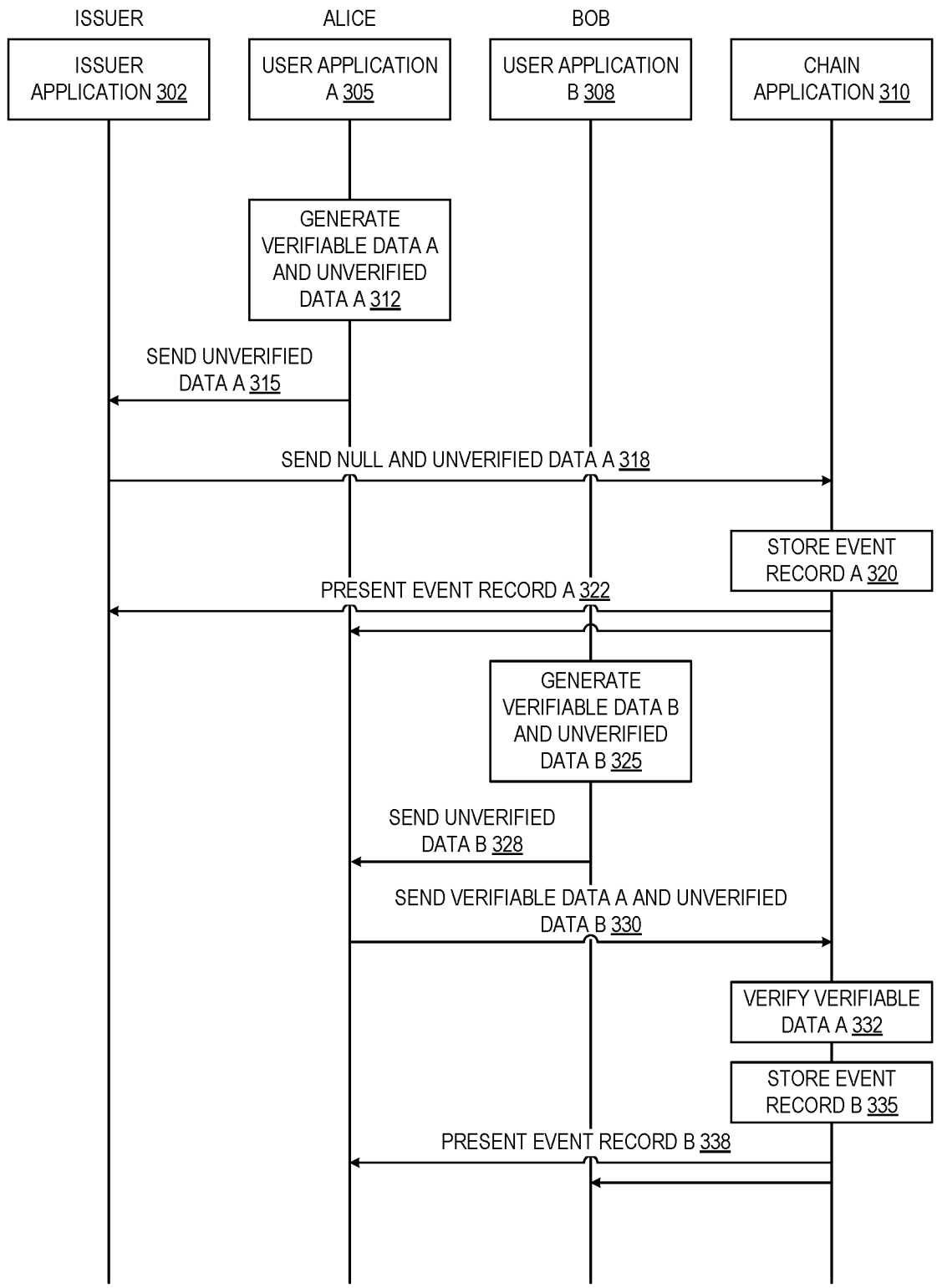

Turning to FIG. 3, Alice decides to transfer a token to Bob but is concerned about her accounts being censored. Instead of using an existing account, Alice acquires a token from an issuer (Steps 312 through 322) and then transfers the token to Bob (Steps 325 through 338). The actions described in FIG. 3 may be performed by computing systems that execute the issuer application (302) (operated by a computing device of an issuer), the user application A (305) (operated by a computing device of Alice), the user application B (308) (operated by a computing device of Bob), and the chain application (310) (executing on a computing device).

At Step 312, the user application A (305) generates verifiable data A and unverified data A for Alice. The verifiable data A may include a secret, a private key, etc. The unverified data A may include a hash, a public key, encrypted data, etc. The verifiable data A may be used later (e.g., Step 330) when the token is transferred from Alice to Bob.

At Step 315, the unverified data A is sent from the user application A (305) to the issuer application (302). Alice retains the verifiable data A at the user application A (305) to prevent others from using the token being acquired.

At Step 318, the unverified data A and null data are sent from the issuer application (302) to the chain application (310). Since the token is being issued, there are no previous records of events and no previous unverified data that could be used to verify verifiable data. Hence, the "verifiable data" from the issuer is null data (i.e., an empty set of data).

At Step 320, the chain application (310) stores the event record A. The chain application (310) stores event records after verifying the verifiable data from the initiator of the transfer of the token. However, for the genesis record, there are no previous records.

In one embodiment, the chain application (310) may verify a token signature provided by the issuer before storing the initial record (referred to as the genesis record). The token signature may be verified using a secure sockets layer (SSL) certificate corresponding to the issuer. The SSL certificate is retrieved from a certificate authority and the public key from the certificate is used to decrypt the token signature to generate a decrypted signature. When the decrypted signature matches the token identifier, the token signature is verified and the chain application (310) proceeds to store an event record A as a current record that includes the null data and the unverified data a that was generated by the user application A (305).

Continuing with FIG. 3, at Step 322, the event record A is presented to one or more of the issuer application (302) and the user application A (305). The event record A is presented by transmitting in the event record A to the issuer application (302) and the user application A (305), which may display the event record A. For example, the user application A (305) may display the event record A to Alice to confirm that the token was issued and transferred to Alice.

At Step 325, the user application B (308) generates verifiable data B and unverified data B for Bob. The verifiable data B may include a secret, a private key, etc. The unverified data B my include a hash, a public key, encrypted data, etc.

At Step 328, the unverified data B is sent from the user application B (308) to the user application A (305). Bob retains the verifiable data B at the user application B (308) to prevent others from using the token being transferred.

At Step 330, the verifiable data A and the unverified data B are sent from the user application A (305) to the chain application (310). The verifiable data A is the data that Alice was keeping secret to maintain possession of the token.

At Step 332, the verifiable data A is verified. When the verifiable data a includes a secret and the previous record includes a hash, the chain application (310) hashes the secret and compares the hash of the secret to the hash from the previous record. When the verifiable data a includes a private key the previous record includes that public key, data is encrypted with one of the private key and the public key and then decrypted with the other of the private key and the public key to determine if the private key and public key correspond to each other.

At Step 335, the event record B is stored. The event record B is stored after verifying that the verifiable data A (for the event record B) corresponds with the unverified data A from the event record A. If the verifiable data A and the unverified data A do not correspond to each other, the chain application (310) does not store the event record B.

At Step 338, the event record B is presented to one or more of the user application A (305) and the user application B (308). The event record B is presented by transmitting the event record A to the user application A (305) and the user application B (308), which may each display the event record A. For example, the user applications A (305) and B (308) may display the event record B to Alice and Bob to confirm that the token was issued and transferred from Alice to Bob.

Turning to FIG. 4, the table (400) stores the event records for the events A (412) through D (418) of a chain record for a token. In one embodiment, the table (400) may be displayed on a user interface of a user application executing on a computing system. Each row of the table (400) corresponds to an event that transfers the token. The token is transferred using secrets and hashes of the secrets for the verifiable and unverified data. The table (400) includes the columns (402), (404), (406), (408), and (410).

The column (402) stores event identifiers. The event identifiers include the event identifiers A (422), B (432), C (442), and D (452) that each identify a different event to transfer a token.

The column (404) stores token identifiers, which identify the token for the events A (412) through D (418) recorded in the table (400). A single token is used and the token identifiers A (424), (434), (444), and (454) may each have the same value to identify the same token.

The column (406) stores signatures of the token for the events A (412) through D (418) recorded in the table (400). A single token is used and the token signatures A (426), (436), (446), (456) may each have the same value and refer to the same token.

The column (408) stores the verifiable data (428), (438), (448), and (458) for the events A (412) through D (418) recorded in the table (400). The genesis record includes the verifiable data (428), which is null data. The verifiable data (438) includes a first secret ($K_1$), which can be verified with the unverified data (430). The verifiable data (438) is verified by hashing the value first secret ($K_1$) and comparing the hash value with the hash stored as the unverified data (430) for the previous event A (412).

The column (410) stores the unverified data (430), (440), (450), and (460) for the events A (412) through D (418) recorded in the table (400). The unverified data (430) for the event A (412) is a hash ($H(K_1)$) that may be used to verify the verifiable data (438) of the subsequent event B (414).

Turning to FIG. 5, the table (500) stores the event records for the events A (512) through D (518) of a chain record for a token. In one embodiment, the table (500) may be displayed on a user interface of a user application executing on a computing system. Each row of the table (500) corresponds to an event that transfers the token. The token is transferred using private keys and public keys for the verifiable and unverified data. The table (500) includes the columns (502), (504), (506), (508), and (510).

The column (502) stores event identifiers. The event identifiers include the event identifiers A (522), B (532), C (542), and D (552) that each identify a different event to transfer a token.

The column (504) stores token identifiers which identify the token for the events A (512) through D (518) recorded in the table (500). A single token is used and the token identifiers A (524), (534), (544), and (554) may each have the same value to identify the same token.

The column (506) stores signatures of the token for the events A (512) through D (518) recorded in the table (500). A single token is used and the token signatures A (526), (536), (546), and (556) may each have the same value and refer to the same token.

The column (508) stores the verifiable data (528), (538), (548), and (558) for the events A (512) through D (518) recorded in the table (500). The genesis record includes the verifiable data (528), which is null data. The verifiable data (538) includes a first private key ($V_1$), which can be verified with the unverified data (530). The verifiable data (538) may be verified by encrypting data to form an encrypted value and decrypting the encrypted value with the public key ($B_1$) stored as the unverified data (530) for the previous event A (512).

The column (510) stores the unverified data (530), (540), (550), and (560) for the events A (512) through D (518) recorded in the table (500). The unverified data (530) for the event A (512) is a public key ($B_1$) that may be used to verify the verifiable data (538) of the subsequent event B (514).

Turning to FIG. 6, the table (600) stores the event records for the events A (608) through I (616) of a chain record for three different tokens (token A, token B, and token C). In one embodiment, the table (600) may be displayed on a user interface of a user application executing on a computing system. The events A (608), B (609), and E (612) are events for the token A. The events C (610), F (613), and H (615) are events for the token B. The events D (611), G (614), and I (616) are events for the token C.

Each row of the table (600) corresponds to an event that transfers one of the tokens. The different tokens are transferred using different combinations of secrets and private keys for the verifiable data and using hashes and public keys for the unverified data. The token A is transferred using secrets and hashes. The token B is transferred using private keys and public keys. The token C is transferred using private keys and secrets for the verifiable data and using public keys and hashes for the unverified data. The table (600) includes the columns (602), (603), (604), (605), and (606).

The column (602) stores event identifiers. The event identifiers include the event identifiers A (621), B (626), C (631), D (636), E (641), F (646), G (651), H (656), and I (661) that each identify a different event to transfer a token.

The column (603) stores token identifiers which identify the token for the events A (608) through I (616) recorded in the table (600). Multiple tokens are used. The token identifiers A (622), (627), and (642) correspond to token A. The token identifiers B (632), (647), and (657) correspond to token B. The token identifiers C (637), (652), and (662) correspond to token C.

The column (606) stores signatures of the token for the events A (608) through I (616) recorded in the table (600). Multiple tokens and token signatures are used. The token signatures A (623), (628), and (643) correspond to token A. The token signatures B (633), (648), and (658) correspond to token B. The token signatures C (638), (653), and (663) correspond to token C.

The column (608) stores the verifiable data (624), (629), (634), (639), (644), (649), (654), (659), and (664) for the events A (608) through I (616) recorded in the table (600). The three genesis records for the three tokens respectively include the verifiable data (624), (634), and (639), which are each null data.

The verifiable data (629) includes a first secret ($K_1$), which can be verified with the unverified data (625). The verifiable data (629) is verified by hashing the value first secret ($K_1$) and comparing the hash value with the hash stored as the unverified data (625) for the previous event A (608).

The verifiable data (649) includes a private key ($V_1$), which can be verified with the unverified data (635). The verifiable data (649) may be verified by encrypting the public key ($B_1$) with the private key ($V_1$) to form an encrypted value $B_1^{V_1}$ and comparing the encrypted value with the previously stored encrypted value from the unverified data (635) for the previous event C (610). The correspondence between the private key ($V_1$) and the public key ($B_1$) was confirmed when the event C (610) was stored by decrypting the encrypted value ($B_1^{V_1}$) from the unverified data (606) using the public key ($B_1$).

The verifiable data (654) includes a private key ($V_2$) and a secret ($K_3$). The unverifiable data (654) may be verified by hashing the secret ($K_3$) to generate the hash ($H(K_3)$), decrypting the encrypted data from the unverified data (640) from the previous event D (611) to generate the decrypted value $$((H(K_3))^{V_2})^{\left(\frac{1}{B_2}\right)},$$

and comparing the hash ($H(K_3)$) to the decrypted value $$((H(K_3))^{V_2})^{\left(\frac{1}{B_2}\right)},$$

which should be the same value.

The column (610) stores the unverified data (625), (630), (635), (640), (645), (650), (655), (660), and (665) for the events A (608) through I (616) recorded in the table (600). For the token A, the unverified data (625) for the event A (608) is a hash ($H(K_1)$) that may be used to verify the verifiable data (629) of the subsequent event B (609). For the token B, the unverified data (635) for the event C (610) is a public key ($B_1$) and an encrypted value ($B_1^{V_1}$) that may be used to verify the verifiable data (649) of the subsequent event F (613). For the token C, the unverified data (640) for the event D (611) is a public key ($B_1$) and an encrypted value $((H(K_3))^{V_2})$ that may be used to verify the verifiable data (654) of the subsequent event G (614).

Embodiments of the invention may be implemented on a computing system. Any combination of a mobile, a desktop, a server, a router, a switch, an embedded device, or other types of hardware may be used. For example, as shown in FIG. 7A, the computing system (700) may include one or more computer processor(s) (702), non-persistent storage (704) (e.g., volatile memory, such as a random access memory (RAM), cache memory), persistent storage (706) (e.g., a hard disk, an optical drive such as a compact disk (CD) drive or a digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) (702) may be one or more cores or micro-cores of a processor. The computing system (700) may also include one or more input device(s) (710), such as a touchscreen, a keyboard, a mouse, a microphone, a touchpad, an electronic pen, or any other type of input device.

The communication interface (712) may include an integrated circuit for connecting the computing system (700) to a network (not shown) (e.g., a local area network (LAN), a wide area network (WAN) such as the Internet, a mobile network, or any other type of network) and/or to another device, such as another computing device.

Further, the computing system (700) may include one or more output device(s) (708), such as a screen (e.g., a liquid crystal display (LCD), a plasma display, a touchscreen, a cathode ray tube (CRT) monitor, a projector, or other display device), a printer, an external storage, or any other output device. One or more of the output device(s) (708) may be the same or different from the input device(s) (710). The input and output device(s) (710 and (708)) may be locally or remotely connected to the computer processor(s) (702), non-persistent storage (704), and persistent storage (706). Many different types of computing systems exist, and the aforementioned input and output device(s) (710 and (708)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system (700) shown in FIG. 7A, or a group of nodes combined may correspond to the computing system (700) shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Figure 7B:
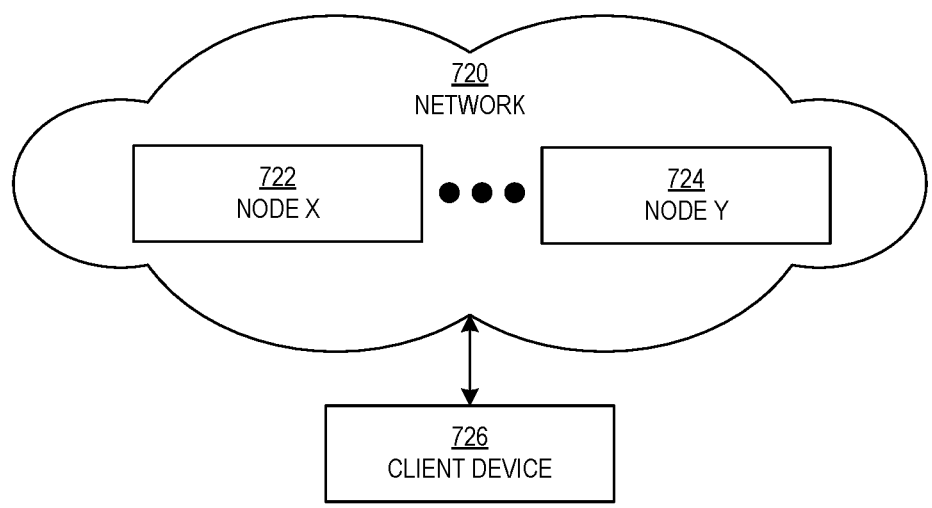

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system (700) shown in FIG. 7A. Further, the client device (726) may include and/or perform all or a portion of one or more embodiments of the invention.

The computing system (700) or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (700) in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (700) of FIG. 7A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (700) in FIG. 7A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (700) of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (700) of FIG. 7A and the nodes (e.g., node X (722), node Y (724)) and/or client device (726) in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving, from a first application, verifiable data for a current record and unverified data for the current record, wherein the unverified data for the current record was received by the first application from a second application;
   verifying the verifiable data for the current record with unverified data from a previous record,
      wherein the verifiable data for the current record comprises a private key, and
      wherein the unverified data from the previous record comprises a public key corresponding to the private key;
   recording the verifiable data for the current record and the unverified data for the current record to the current record responsive to verifying the verifiable data for the current record; and
   presenting the current record to one or more of the first application and to the second application.

2. The method of claim 1, further comprising:
   presenting the current record, wherein the current record is displayed on a user device executing the one or more of the first application and the second application.

3. The method of claim 1, further comprising:
   verifying the verifiable data for the current record,
      wherein the unverified data of the previous record further comprises the public key signed with the private key.

4. The method of claim 1, further comprising:
   verifying the verifiable data for the current record,
      wherein the verifiable data of the current record further comprises a secret, and wherein the unverified data of the previous record further comprises a hash, of the secret, signed with the private key.

5. The method of claim 1, further comprising:
recording the verifiable data for the current record and the unverified data for the current record to the current record, wherein the current record comprises an event identifier of a transfer of a token.

6. The method of claim 1, further comprising:
recording the verifiable data for the current record and the unverified data for the current record to the current record,
wherein the current record is part of a sequence of records corresponding to a token identifier and a token signature.

7. The method of claim 1, further comprising:
recording the verifiable data for the current record and the unverified data for the current record to the current record, wherein the current record comprises a token identifier and a token signature.

8. The method of claim 1, further comprising:
recording the verifiable data for the current record and the unverified data for the current record to the current record, wherein the current record is part of a sequence of records of a plurality of token identifiers and a plurality of token signatures.

9. A system comprising:
a processor;
a memory; and
a chain application stored in the memory, executing on the processor, and configured for:
receiving, from a first application, verifiable data for a current record and unverified data for the current record, wherein the unverified data for the current record was received by the first application from a second application;
verifying the verifiable data for the current record with unverified data from a previous record,
wherein the verifiable data for the current record comprises a private key, and
wherein the unverified data from the previous record comprises a public key corresponding to the private key;
recording the verifiable data for the current record and the unverified data for the current record to the current record responsive to verifying the verifiable data for the current record; and
presenting the current record to one or more of the first application and to the second application.

10. The system of claim 9, wherein the application is further configured for:
presenting the current record, wherein the current record is displayed on a user device executing the one or more of the first application and the second application.

11. The system of claim 9, wherein the application is further configured for:
verifying the verifiable data for the current record,
wherein the unverified data of the previous record further comprises the public key signed with the private key.

12. The system of claim 9, wherein the application is further configured for:
verifying the verifiable data for the current record,
wherein the verifiable data of the current record further comprises a secret, and
wherein the unverified data of the previous record further comprises a hash, of the secret, signed with the private key.

13. The system of claim 9, wherein the application is further configured for:
recording the verifiable data for the current record and the unverified data for the current record to the current record, wherein the current record comprises an event identifier of a transfer of a token.

14. The system of claim 9, wherein the application is further configured for:
recording the verifiable data for the current record and the unverified data for the current record to the current record, wherein the current record is part of a sequence of records corresponding to a token identifier and a token signature.

15. The system of claim 9, wherein the application is further configured for:
recording the verifiable data for the current record and the unverified data for the current record to the current record, wherein the current record comprises a token identifier and a token signature.

16. A method comprising:
receiving, by a first application from a second application, unverified data for a current record;
transmitting, by the first application to a chain application, verifiable data for a current record and unverified data for the current record;
displaying the current record after the current record is recorded by a chain application, wherein the chain application:
verifies the verifiable data for the current record with unverified data from a previous record,
wherein the verifiable data for the current record comprises a private key, and
wherein the unverified data from the previous record comprises a public key corresponding to the private key; and
records the verifiable data for the current record and the unverified data for the current record to the current record responsive to verifying the verifiable data for the current record.

* * * * *